US008284834B2

(12) United States Patent  (10) Patent No.: US 8,284,834 B2
Inoue et al.  (45) Date of Patent: Oct. 9, 2012

(54) VIDEO-SIGNAL PROCESSING APPARATUS, VIDEO-SIGNAL PROCESSING METHOD, AND VIDEO-SIGNAL PROCESSING SYSTEM

(75) Inventors: Takao Inoue, Kanagawa (JP); Tetsushi Kokubo, Kanagawa (JP); Hitoshi Mukai, Kanagawa (JP); Hirofumi Hibi, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 12/479,252

(22) Filed: Jun. 5, 2009

(65) Prior Publication Data

US 2009/0303384 A1    Dec. 10, 2009

(30) Foreign Application Priority Data

Jun. 9, 2008 (JP) ................................. 2008-150964
May 22, 2009 (JP) ................................. 2009-124110

(51) Int. Cl.
    H04N 7/12    (2006.01)
(52) U.S. Cl. ................................. 375/240.01
(58) Field of Classification Search ................... 345/1.1, 345/30, 581; 348/55, 56, 365, 469, 649, 348/790, 42; 375/240.03, 240.18, 240.01–240.29; 382/240, 107, 236
    See application file for complete search history.

(56) References Cited

U.S. PATENT DOCUMENTS

| 6,924,833 B1 * | 8/2005 | McDowall et al. ............. 348/42 |
| 2004/0056948 A1 * | 3/2004 | Gibson ............................ 348/56 |
| 2005/0093773 A1 * | 5/2005 | Kuroki et al. ................... 345/30 |
| 2005/0168706 A1 * | 8/2005 | Sakai .............................. 353/69 |
| 2007/0195408 A1 * | 8/2007 | Divelbiss et al. ............ 359/462 |
| 2007/0200961 A1 * | 8/2007 | Ohara ........................... 348/790 |
| 2007/0266412 A1 * | 11/2007 | Trowbridge et al. ............ 725/90 |
| 2008/0043031 A1 * | 2/2008 | Jagmag ......................... 345/581 |
| 2008/0049141 A1 * | 2/2008 | Fukui et al. ................... 348/565 |
| 2008/0068284 A1 * | 3/2008 | Watanabe et al. ............. 345/1.1 |
| 2009/0180029 A1 * | 7/2009 | Peng et al. .................... 348/649 |

FOREIGN PATENT DOCUMENTS

| JP | 4-321020 | 11/1992 |
| JP | 5-300453 | 11/1993 |
| JP | 6-175631 | 6/1994 |
| JP | 7-222087 | 8/1995 |
| JP | 10-13825 | 1/1998 |
| JP | 10-240212 | 9/1998 |
| JP | 10-262200 | 9/1998 |
| JP | 10-275074 | 10/1998 |
| JP | 11-88794 | 3/1999 |
| JP | 2001-197366 | 7/2001 |
| JP | 2001-238185 | 8/2001 |

(Continued)

*Primary Examiner* — Tung Vo
*Assistant Examiner* — Stephen Smith
(74) *Attorney, Agent, or Firm* — Oblon, Spivak, McClelland, Maier & Neustadt, L.L.P.

(57) ABSTRACT

A video-signal processing apparatus includes a video-signal input unit to which a video signal including multiple images arranged in a time sequential manner is input; a time-division output unit configured to output, in a time-division manner, the video signal constituting n images corresponding to the multiple images; signal processing units configured to individually perform image quality adjustments on the n images output from the time-division output unit; operation input units through which adjustment values of the image quality adjustments performed by the signal processing units are input; and image output units configured to output images that have been subjected to the image quality adjustments using the signal processing units.

15 Claims, 12 Drawing Sheets

FOREIGN PATENT DOCUMENTS

| | | |
|---|---|---|
| JP | 2002-7117 | 1/2002 |
| JP | 2002-300617 | 10/2002 |
| JP | 2002-340578 | 11/2002 |
| JP | 2006-186768 | 7/2006 |
| JP | 2006-227096 | 8/2006 |
| JP | 2006-300982 | 11/2006 |
| JP | 2006-301105 | 11/2006 |
| JP | 2007-304204 | 11/2007 |
| JP | 2007-310326 | 11/2007 |
| JP | 2008-64831 | 3/2008 |
| JP | 2008-70397 | 3/2008 |
| WO | WO 2008/066954 A1 | 6/2008 |

* cited by examiner

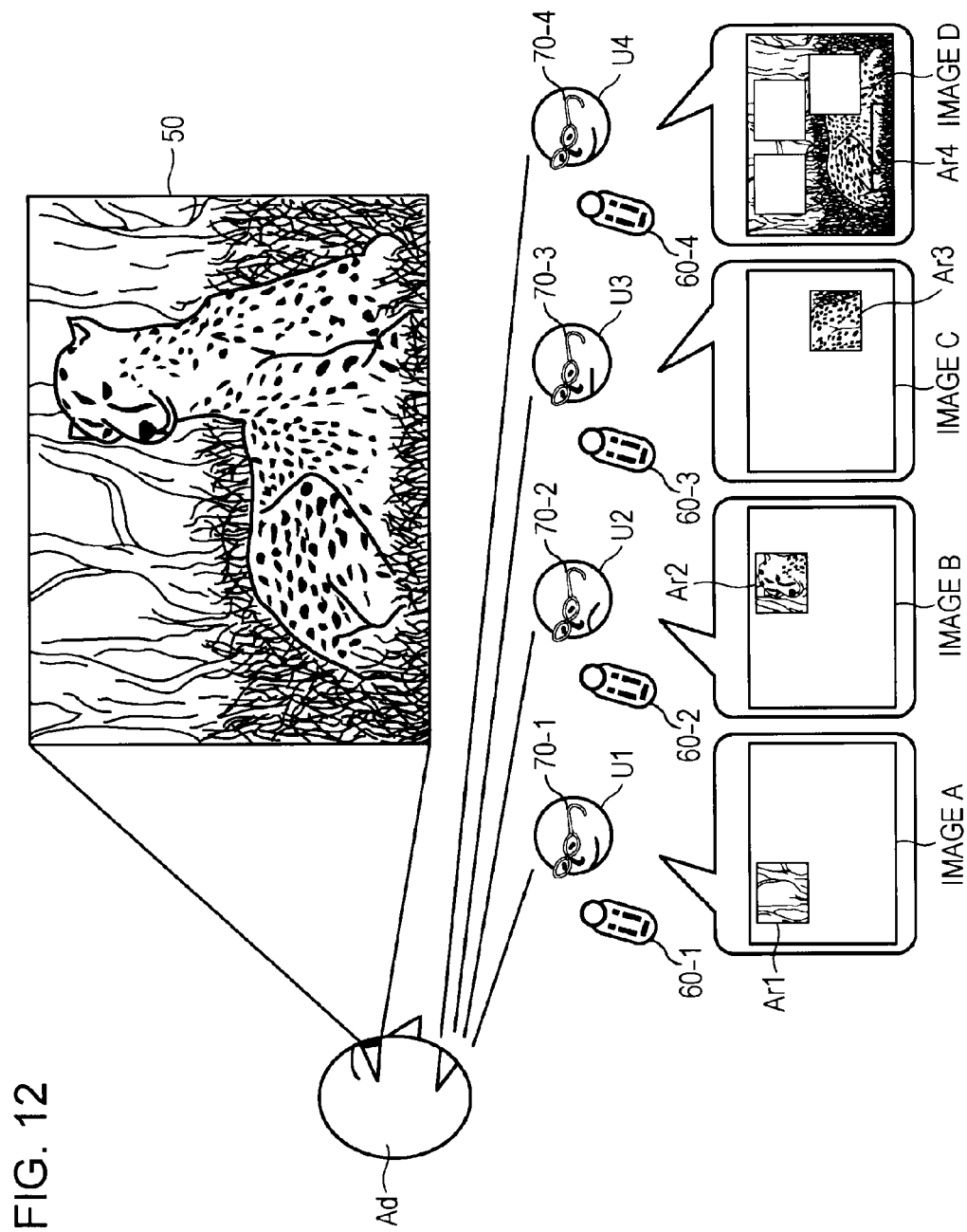

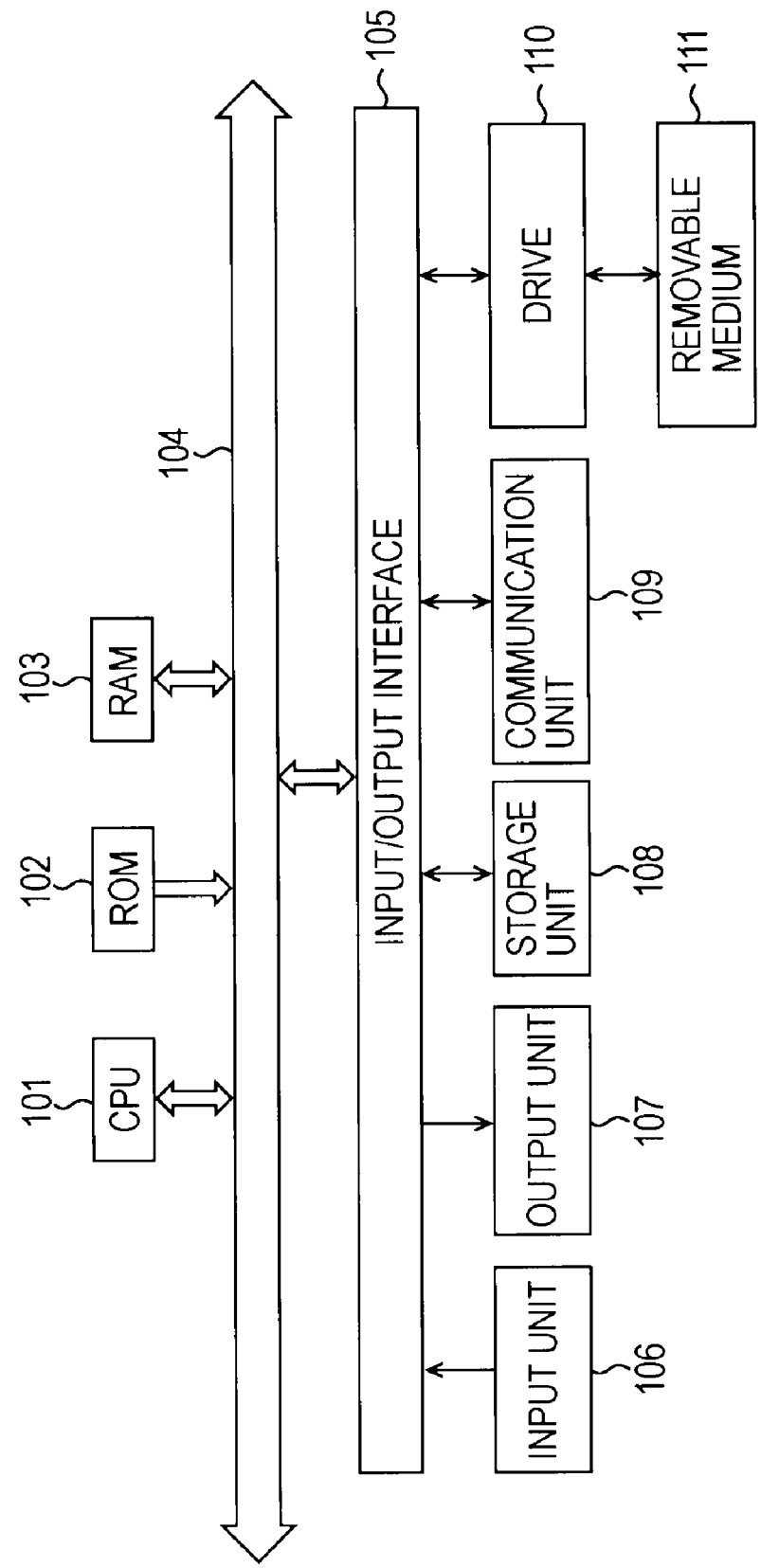

VIDEO-SIGNAL PROCESSING APPARATUS, VIDEO-SIGNAL PROCESSING METHOD, AND VIDEO-SIGNAL PROCESSING SYSTEM

BACKGROUND OF THE INVENTION

1. Field of the Invention

The present invention relates to a video-signal processing apparatus, a video-signal processing method, and a video-signal processing system, and more particularly, to the technique of displaying an image relating to one frame in a time-division manner.

2. Description of the Related Art

In the related art, images of content items of different types are simultaneously displayed on one screen, and accordingly, multiple viewers can individually view the images of the different content items. For example, Japanese Unexamined Patent Application Publication No. 4-321020 describes the technique of mounting polarizing panels having different polarization directions on two projectors, and allowing viewers to view, through pairs of polarizing glasses, video images projected through the polarizing panels onto a screen. In this way, different viewers can see different content items on one screen.

Japanese Unexamined Patent Application Publication No. 2006-186768 describes the technique of displaying images of different content items on an image display apparatus in a time-division manner and allowing viewers to see the images through pairs of glasses with liquid crystal shutters. With this technique, the liquid crystal shutters of the pairs of glasses worn by the viewers are individually opened at the timing at which images belonging to content the viewers wish to see are displayed, thereby selectively causing only the images of the content desired by the viewers to reach the viewers.

By using the foregoing techniques, it is made possible to present, to multiple viewers, images of content items the multiple viewers wish to view, without preparing multiple screens.

SUMMARY OF THE INVENTION

Now, in a method of presenting multiple content items of different types using one screen, such as that described above, images belonging to content items of different types are presented to individual viewers. Therefore, there is significance that presented images are not correlated.

That is, no one has ever regarded images presented through polarizing panels with different polarization directions or images presented in a time-division manner as correlated images. For example, no new value has been added by displaying images of the same source in a time-division manner.

At the same time, in recent years, high-definition video content supplied using digital broadcasting and high-quality video content recorded on a Blu-ray Disc® have been seen on a large screen, such as 40 inches or more. Very small noise or distortion on the screen, which was not striking on a screen of related art, such as 39 inches or less, becomes striking on such a large screen. Therefore, when processing such as resolution adjustment, distortion suppression, contrast adjustment, and color adjustment is evenly performed on the entire screen, as in the case of a small screen of related art, or when automatic adjustment is performed by analyzing a picture or a pattern in an input image and optimizing the image quality, the image quality of one portion of the screen may be improved, but the image quality of another portion of the screen may not be improved. In some cases, the image quality of a portion of the screen may become worse than it was before.

Therefore, image quality adjustment has been unevenly or locally performed by restricting a target to be subjected to image quality enhancement or automatic adjustment to a photographic object that can be easily distinguished, such as the face of a person. However, in such processing, it is very difficult to allow, in place of the eyes or the brain of a person, a device or a computer to distinguish an object. It is effective to manually specify a portion to be subjected to image quality adjustment or to manually perform image quality adjustment itself. However, it takes time and effort for one person to individually adjust photographic objects displayed on a large screen, such as 40 inches or more, of a display device that is a high-definition screen having 900,000 pixels (1280×768) or more.

It is desirable to efficiently perform image quality adjustment by displaying images of the same source in a time-division manner.

According to an embodiment of the present invention, there is provided a video-signal processing apparatus including a video-signal input unit to which a video signal including multiple images arranged in a time sequential manner is input; and a time-division output unit configured to output, in a time-division manner, the video signal constituting n images corresponding to the multiple images. Furthermore, the video-signal processing apparatus includes signal processing units configured to individually perform image quality adjustments on the n images output from the time-division output unit; operation input units through which adjustment values of the image quality adjustments performed by the signal processing units are input; and image output units configured to output images that have been subjected to the image quality adjustments using the signal processing units.

Accordingly, the image quality of images included in one video signal can be simultaneously adjusted by signal processing units provided in a manner correlated with n images output in a time-division manner.

According to an embodiment of the present invention, there is provided a video-signal processing method including the steps of: receiving an input of a video signal including multiple images arranged in a time sequential manner, the video signal serving as a single content item; and outputting a plurality of images generated on the basis of the multiple images, in a time-division manner, within output periods of the multiple images.

According to the video-signal processing method, an input of a video signal including multiple images arranged in a time sequential manner is input, the video signal serving as a single content item; and a plurality of images generated on the basis of the multiple images are output, in a time-division manner, within output periods of the multiple images.

According to an embodiment of the present invention, there is provided a program and a program recorded on a recording medium, the program causing a computer to perform a process including the steps of: outputting, in a time-sequential manner, a video signal constituting n images corresponding to input multiple images arranged in a time sequential manner; performing image quality adjustments individually on the n images; obtaining adjustment values of the image quality adjustments performed in the step of performing image quality adjustments; and outputting images that have been subjected to the image quality adjustments performed in the step of performing image quality adjustments.

According to the program and the program recorded on the recording medium, a video signal constituting n images corresponding to input multiple images arranged in a time sequential manner are output in a time-sequential manner;

adjustment values of image quality adjustments individually performed on the n images are obtained, and the image quality adjustments are performed individually on the n images; and images that have been subjected to the image quality adjustments are output.

According to the embodiments of the present invention, the image quality of images included in one video signal is adjusted in parallel by signal processing units provided in a manner correlated with n images output in a time-division manner, whereby the image quality adjustment processing becomes more efficient.

BRIEF DESCRIPTION OF THE DRAWINGS

FIGS. 11A to 11D are diagrams illustrating examples of work areas according to the second embodiment of the present invention, wherein FIG. 11A illustrates an example of an area on a screen seen by a user U1, FIG. 11B illustrates an example of an area on the screen seen by a user U2, FIG. 11C illustrates an example of an area on the screen seen by a user U3, and FIG. 11D illustrates an example of an area on the screen seen by a user U4;

FIG. 12 is a schematic diagram illustrating a structure example of a system according to the second embodiment of the present invention; and FIG. 13 is a block diagram illustrating a structure example of a computer according to an embodiment of the present invention.

DESCRIPTION OF THE PREFERRED EMBODIMENTS

First Embodiment

Figure 1:
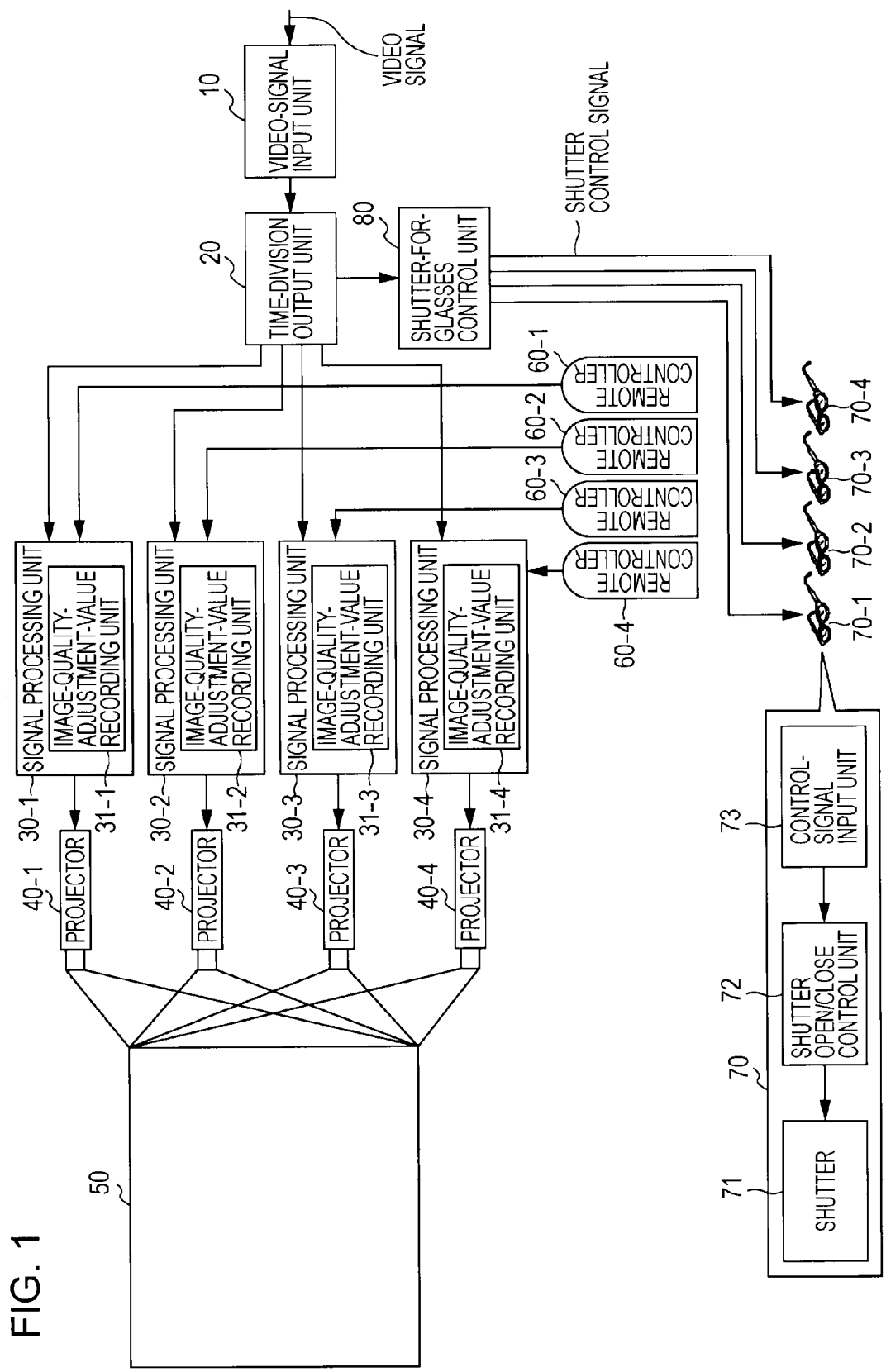
FIG. 1 is a block diagram illustrating an internal structure example of a system according to a first embodiment of the present invention.

A first embodiment of the present invention will now be described with reference to FIGS. 1 to 8. FIG. 1 is a block diagram illustrating a structure example of a system according to the present embodiment. In the present embodiment, a structure and processing for allowing four users to individually adjust images of the same source displayed on one screen will be described by way of example.

The system illustrates in FIG. 1 includes a video-signal input unit 10 to which a video signal is input, a time-division output unit 20 that outputs a video signal while shifting the phase, and signal processing units 30-1 to 30-4 that are provided in a manner correlated with the number of images output from the time-division output unit 20 in a time-division manner and that apply image quality adjustment processing to video signals. The system further includes projectors 40-1 to 40-4 that serve as output units and that output video signals obtained by performing signal processing in the signal processing units 30-1 to 30-4, and a screen 50 onto which projection light from the projectors 40-1 to 40-4 is directed.

Adjustment values of image quality adjustments performed by the signal processing units 30-1 to 30-4 are entered by users U1 to U4 using remote controllers 60-1 to 60-4, respectively, which serve as operation input units. The users U wear pairs of glasses with shutters 70-1 to 70-4. The pairs of glasses with shutters 70-1 to 70-4 include shutters 71. Opening and closing of the shutters 71 is controlled in accordance with a timing of outputting video signals from the time-division output unit 20 in a time-division manner while shifting the phase. Opening and closing of the shutters 71 of the pairs of glasses with shutters 70-1 to 70-4 is controlled on the basis of shutter control signals output from a shutter-of-glasses control unit 80. Synchronization signals of video signals output from the time-division output unit 20 in a time-division manner while shifting the phase are supplied to the shutter-of-glasses control unit 80. At timings synchronized with frame periods indicated by the synchronization signals, the shutter-of-glasses control unit 80 individually generates shutter control signals for the pairs of glasses with shutters 70-1 to 70-4.

In the present specification, it is represented that a video signal includes multiple frames. However, a video signal may include multiple fields, instead of multiple frames. That is, the term "frame" may be read as the term "field" in the present specification.

A video signal having a frame rate of, for example, 60 Hz is input to the video-signal input unit 10. Here, among video signals constituting image content, video signals in a frame section where image quality adjustment is performed are repeatedly input. That is, frames from a start frame Fs to an end frame Fe where image quality adjustment is performed are repeatedly input a predetermined number of times. The number of frames from the start frame Fs to the end frame Fe is m, and the number of times frames are repeatedly input is p. That is, m×p frames are input to the video-signal input unit 10.

Figure 2:
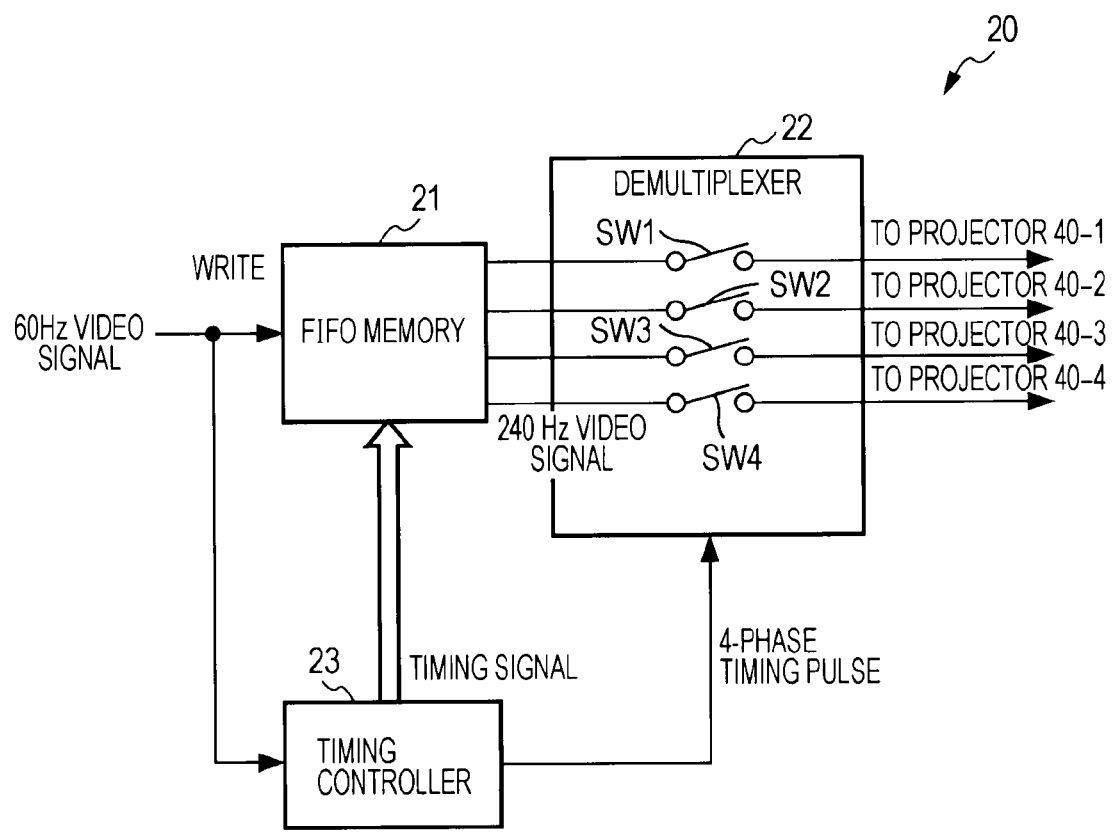
FIG. 2 is a block diagram illustrating an internal structure example of a time-division output unit according to the first embodiment of the present invention.

The time-division output unit 20 converts the 60-Hz video signal input via the video-signal input unit 10 into a 240-Hz video signal whose frame rate is four times faster than that of the 60-Hz video signal. That is, the time-division output unit 20 generates images of four frames from an image of one frame by increasing the frame rate four times. In the following description, the number of frames obtained by division performed by the time-division output unit 20 is n. FIG. 2 illustrates a structure example of the time-division output unit 20. The time-division output unit 20 illustrated in FIG. 2 includes a First In First Out (FIFO) memory 21, a demultiplexer (serial-to-parallel conversion processing unit) 22 including switches SW1 to SW4, and a timing controller 23.

The FIFO memory 21 is a memory from which items of data can be read in the order the items of data are written and can store a video signal of one frame. The FIFO memory 21 holds a video signal of the previous frame until a video signal of the next frame is written.

Under control of the timing controller 23, the video signal of the frame held in the FIFO memory 21 is read at a rate n times faster than a 1-frame writing period, whereby the rate of the output signal from the FIFO memory 21 becomes n-times faster.

The switches SW1 to SW4 of the demultiplexer 22 are connected respectively at predetermined timings under control of the timing controller 23. Specifically, the switch SW1 is turned ON at a timing at which a video signal is projected from the projector 40-1. The switch SW2 is turned ON at a timing at which a video signal is projected from the projector 40-2. Also, the switch SW3 is turned ON at a timing at which a video signal is projected from the projector 40-3. The switch SW4 is turned ON at a timing at which a video signal is projected from the projector 40-4. A video-signal output timing will be described later with reference to FIG. 3.

The demultiplexer 22 is connected to the projectors 40-1 to 40-4. The demultiplexer 22 outputs a video signal that has been input to the switch SW1 to the projector 40-1. The demultiplexer 22 outputs a video signal that has been input to the switch SW2 to the projector 40-2. The demultiplexer 22 outputs a video signal that has been input to the switch SW3 to the projector 40-3. The demultiplexer 22 outputs a video signal that has been input to the switch SW4 to the projector 40-4.

The timing controller 23 supplies a timing signal that gives a write instruction (a 60-Hz write clock and a write enable signal) and a timing signal that gives a read instruction (a 240-Hz read clock and a read enable signal) to the FIFO memory 21. The timing controller 23 supplies a four-phase timing pulse to the demultiplexer 22.

In this way, a 60-Hz input video signal is converted to a 240-Hz video signal using the time-division output unit 20. Video images of frames constituting the 240-Hz video signal are distributed among the projectors 40-1 to 40-4. Images of four frames, which are obtained by conversion performed in the time-division output unit 20, may be the same images obtained by repeating the same image for four frames or different images in which motion correction is performed by performing frame interpolation processing or the like.

Furthermore, the demultiplexer 22 outputs the video signals constituting four frames to the projectors 40-1 to 40-4 while shifting the phase at intervals of $1/240$ s. At the same time, the demultiplexer 22 outputs synchronization signals extracted from the video signals to the shutter-of-glasses control unit 80.

In this example, the number of the users U who perform image quality adjustment is four, and hence, the time-division output unit 20 increases the rate of a video signal four times. However, n that indicates the number of times the rate is increased is not limited to four and may be any integer greater than or equal to two. For example, when five users U perform image quality adjustment, the time-division output unit 20 may perform processing to increase the original rate of a video signal five times. That is, the time-division output unit 20 may output a video image while shifting the phase at intervals of $1/300$ s. The value of n can be changed to any value in accordance with the number of users U.

Using adjustment values input through the remote controllers 60-1 to 60-4, the signal processing units 30-1 to 30-4 apply image quality adjustment processing to video signals input from the time-division output unit 20. Image quality adjustment is performed using, for example, a classification adaptive process that converts a standard television signal to a high-definition signal. The algorithm of the classification adaptive process is disclosed in U.S. Pat. No. 6,987,539, which is hereby incorporated by reference.

The classification adaptive process is the technique of creating a high-resolution video image by performing arithmetic processing using correlation characteristics between a standard definition (SD) signal and a high-definition (HD) signal. Unlike a linear interpolation method, the classification adaptive process can represent a more realistic texture and resolution of a photographic object.

The classification adaptive process can represent a more realistic texture and resolution of a photographic object by using a correlation between an HD signal and a virtual signal that has a greater amount of information than the HD signal. Also, a progressive video signal can directly be generated from an HD signal. In this way, even when an HD video image obtained by converting an SD signal to a 1080-interlace (i) HD signal is broadcast using digital broadcasting, a 1080-progressive (p) signal can be generated from the HD signal. Therefore, the representation capability of a full HD panel can be put to maximum use.

The classification adaptive process can perform image quality adjustment using two adjustment axes, one for resolution and the other for noise suppression, and can perform image quality adjustment after zooming in/out a displayed image at a desired magnification, panning the displayed image, or tilting the displayed image. In the present embodiment, for example, such adjustments are simultaneously performed by the multiple users U1 to U4.

In other words, the users U1 to U4 individually enter adjustment values of the two adjustment axes, one for resolution and the other for noise suppression, a zoom magnification, the amount of panning, and the amount of tilting. These values may be adjusted using buttons (not illustrated in the drawings) of the remote controllers 60, or may be adjusted using arrow keys or the like. In particular, in adjustment using two axes of resolution and noise suppression, a desired position on a two-dimensional plane defined by the two axes can be specified using the arrow keys. Therefore, the users U1 to U4 can more intuitively enter operations. Alternatively, instead of using the remote controllers 60, the users U may use joysticks or the like.

In the present embodiment, among adjustable ranges that are represented using the adjustment axes of the classification adaptive process, different adjustable ranges are allocated in advance to the users U1 to U4. In this way, the users U1 to U4 can adjust the adjustment values within the allocated adjustable ranges. Each adjustable range includes, for example, eight bits (0 to 255) and is divided into four areas at "significantly high resolution", "high resolution", "low resolution", and "significantly low resolution". The adjustable range at "significantly high resolution" is assigned to the user U1 who likes the image quality with significantly high resolution. The adjustable range at "high resolution" is assigned to the user U2 who likes the image quality with high resolution. The adjustable range at "low resolution" is assigned to the user U3 who likes the image quality with low resolution. The adjustable range at "significantly low resolution" is assigned to the user U4 who likes the image quality with significantly low resolution.

Although the case where the resolution adjustment is performed has been described by way of example, noise suppression may be performed, or adjustment using the two axes, one for resolution and the other for noise suppression, may be performed. When adjustment is performed using the two axes, the adjustment work is performed multiple times using all combinations of the adjustable ranges of resolution and the adjustable ranges of noise suppression, and the adjustment history is stored.

Adjustment values set by the user U1 are entered using the remote controller 60-1 and input to the signal processing unit 30-1. Adjustment values set by the user U2 are entered using the remote controller 60-2 and input to the signal processing unit 30-2. Adjustment values set by the user U3 are entered using the remote controller 60-3 and input to the signal processing unit 30-3. Adjustment values set by the user U4 are entered using the remote controller 60-4 and input to the signal processing unit 30-4.

The signal processing units 30-1 to 30-4 perform image quality adjustments on the basis of adjustment values input from the remote controllers 60-1 to 60-4 and output image-quality-adjusted video signals to the projectors 40-1 to 40-4, respectively. When no adjustment values are input from the remote controllers 60-1 to 60-4, the signal processing units 30-1 to 30-4 output, as a default setting, video signals prior to being subjected to image quality adjustment to the projectors 40-1 to 40-4, respectively. The signal processing units 30-1 to 30-4 include image-quality-adjustment-value recording units 31-1 to 31-4 that record adjustment values used in image quality adjustments. That is, histories of operations entered by the users U1 to U4 using the remote controllers 60-1 to 60-4 are recorded in the image-quality-adjustment-value recording units 31-1 to 31-4.

The adjustment values recorded in the image-quality-adjustment-value recording units 31-1 to 31-4 are used when the users U1 to U4 wish to check the details of the work after image quality adjustment processes performed by the users U1 to U4 are completed. The details of the work can be checked by replaying images. A replaying process will be described later.

The projectors 40-1 to 40-4 project video images based on input video signals onto the screen 50. The projectors 40-1 to 40-4 use, for example, liquid crystal displays (LCDs) for light modulation devices and light-emitting diodes (LEDs) for light sources. In synchronization with video signals input from the signal processing units 30-1 to 30-4, the projectors 40-1 to 40-4 turn ON/OFF the light sources. That is, the projectors 40-1 to 40-4 turn ON the light sources at the timing of inputting video signals from the signal processing units 30-1 to 30-4, and turn OFF the light sources when no video signals are being input.

In this example, four projectors 40 are used. Video signals output from the time-division output unit 20 in a time-division manner are sequentially input to the four projectors 40. Thus, when turning ON/OFF of the light sources is regarded as a shutter that switches between light transmission and no light transmission (blocking of light), the shutter numerical aperture of the individual projectors 40-1 to 40-4 is 1/n=¼=25%. Projection light from the projectors 40-1 to 40-4 is directed onto the same face of the screen 50.

In this example, the case where the projectors 40 using LCDs as light modulation devices and LEDs as light sources has been described by way of example. Alternatively, the present embodiment may be applied to projectors using digital micromirror devices (DMDs) as light modulation devices. Alternatively, the present embodiment is applicable to projectors using cathode ray tubes (CRTs). When an apparatus in which opening/closing of a shutter using a light source is difficult to do, such as an apparatus in which a lamp device with a slow ON/OFF time response, such as a xenon lamp or a metal halide lamp, is used as a light source is employed, a physical shutter may be provided in front of a video image output section of the projector 40. A physical shutter employed here may be a notched disk whose periphery is partially notched in the shape of a fan having a predetermined central angle. The shutter is opened by rotating the notched disc so that the notched portion is positioned in front of the video image output section, and the shutter is closed by rotating the notched disc so that the remaining, unnotched portion is positioned in front of the video image output section. The central angle of the fan shape, which determines the range of the notch, is determined in accordance with the aperture of the shutter. When the shutter aperture is 1/n=¼=25%, the central angle is 360°×0.25=90°.

The pairs of glasses with shutters 70-1 to 70-4 worn by the users U1 to U4 include the shutters 71 including liquid crystal shutters or the like, shutter open/close control units 72 that control turning ON/OFF of the shutters 71, and control-signal input units 73. Shutter control signals output from the shutter-of-glasses control unit 80 are input to the control-signal input units 73. The pairs of glasses with shutters 70-1 to 70-4 include selector switches (not illustrated in the drawings). By selecting each of the selector switches, the type of a shutter control signal to be received can be selected.

In this example, a channel through which a video signal is input from the time-division output unit 20 to the signal processing unit 30-1 is called a channel CHA, and a channel through which a video signal is input from the time-division output unit 20 to the signal processing unit 30-2 is called a channel CHB. A channel through which a video signal is input from the time-division output unit 20 to the signal processing unit 30-3 is called a channel CHC, and a channel through which a video signal is input from the time-division output unit 20 to the signal processing unit 30-4 is called a channel CHD.

In this case, the user U1 who inputs an adjustment value to the signal processing unit 30-1 selects the selector switch so that a shutter control signal to be received at the pair of glasses with a shutter 70-1 is one that is generated on the basis of a synchronization signal transmitted through the channel CHA. With such a setting, the shutter 71 is turned ON at a timing at which a video image of the channel CHA is displayed on the screen 50. That is, for the user U1, the image quality is adjusted using the signal processing unit 30-1, and only an image projected through the projector 40-1 onto the screen 50 can be seen.

Since a video image of any channel can be allowed to be seen by selecting the selector switch, a video image of a particular channel can be allowed to be seen by a person other than the users U. Furthermore, for example, the user U1 may adjust the selector switch of the pair of glasses with a shutter 70-1 to one of the other channels CHB to CHD to see the screen on which adjustment is performed by a corresponding one of the other users U2 to U4 and to check the details of the adjustment, and then the user U1 may change the selector switch back to the channel CHA the user U1 is in charge of and perform the actual adjustment work.

In this example, it is assumed that the pairs of glasses with shutters 70-1 to 70-4 are physically connected to the shutter-of-glasses control unit 80 via cable or the like. However, the structure is not limited to this. For example, the present embodiment is applicable to a structure in which a shutter control signal is transmitted using a wireless signal, such as an infrared signal.

Also in this example, the case where the shutters 71 of the pairs of glasses with shutters 70-1 to 70-4 are implemented by liquid crystal shutters whose transmission factors are controlled by applying forces based on electrical fields to the liquid crystal molecules has been described by way of example. However, the state may be mechanically switched between a state in which light is transmitted and a state in which light is blocked, using the technology of micro-electro-mechanical systems (MEMS). Furthermore, any scheme, other than that using liquid crystal shutters or MEMS, may be employed as long as the state can be switched between a state in which light is transmitted and a state in which light is blocked.

Figure 3:
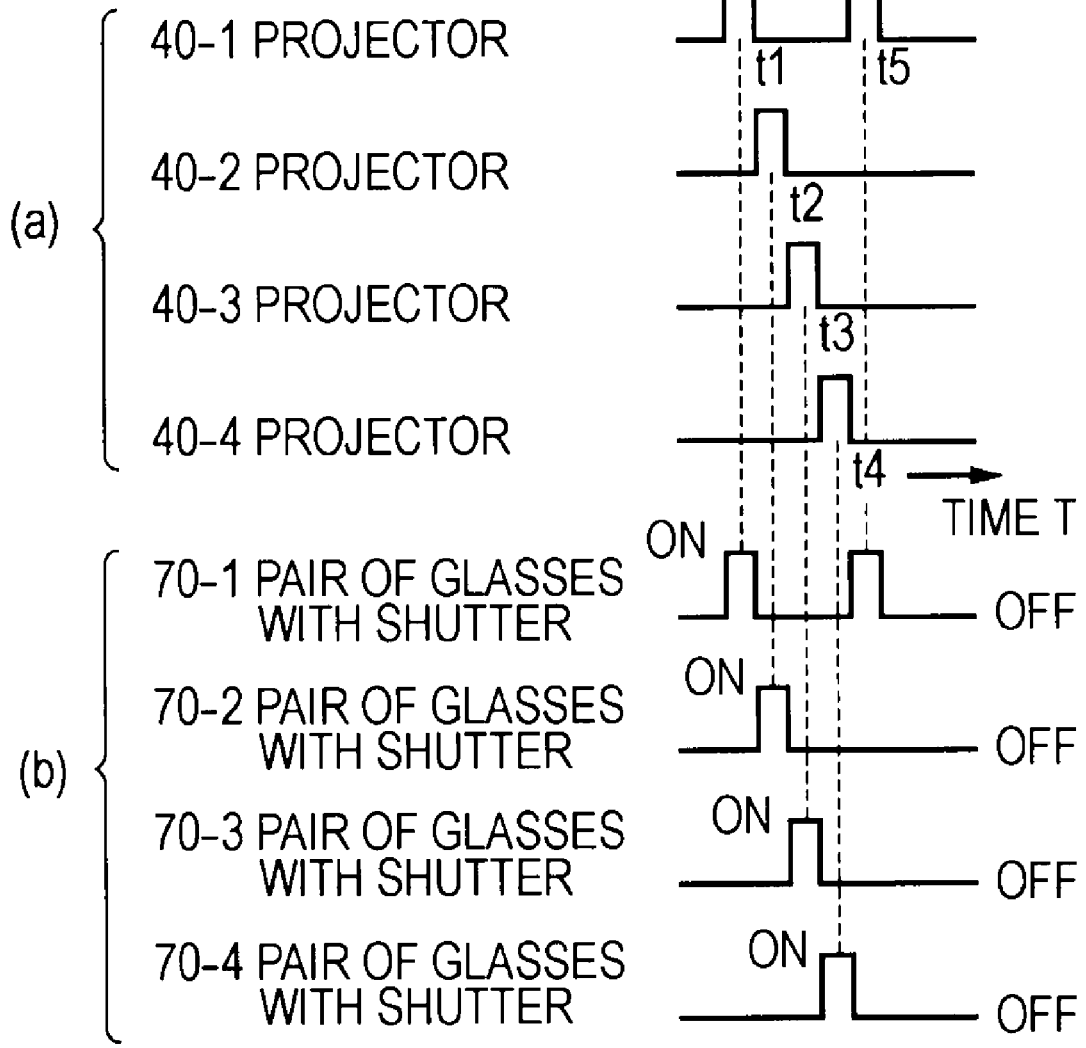
FIG. 3 is a timing chart illustrating an example of correlation between a timing of outputting video images from projectors and a timing of opening/closing shutters of pairs of glasses with shutters according to the first embodiment of the present invention, wherein part (a) illustrates a timing of outputting video images from projectors, and part (b) illustrates a timing of opening/closing shutters of pairs of glasses with shutters.

Referring now to FIG. 3, the timing of outputting video images from the projectors 40-1 to 40-4 and the timing of opening/closing the shutters 71 of the pairs of glasses with shutters 70-1 to 70-4 will be described.

Part (a) of FIG. 3 is a timing chart illustrating the timing of outputting video images from the projectors 40-1 to 40-4, where time (T) is plotted in abscissa. Part (a) of FIG. 3 illustrates that, when a video image is output from the projector 40-1 at t1, a video image is output from the projector 40-2 at t2, which is subsequent to t1. Thereafter, a video image is output from the projector 40-3 at t3, and a video image is output from the projector 40-4 at t4.

Figure 4:
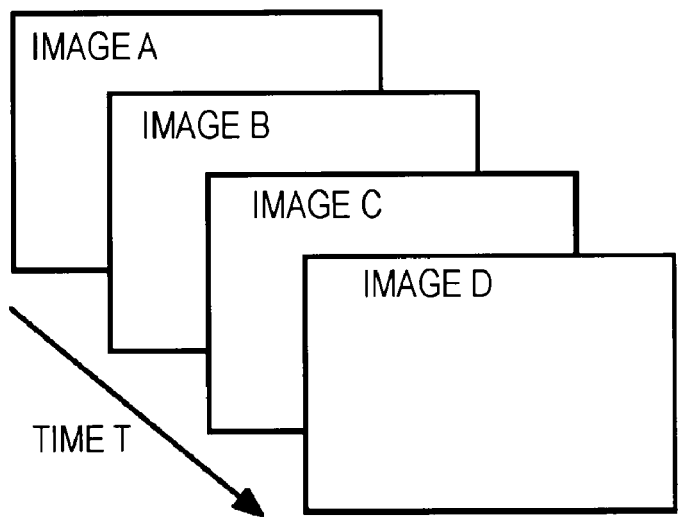
FIG. 4 is a diagram illustrating an example of displaying images on a screen according to the first embodiment of the present invention.

In this manner, video images are sequentially output from the projectors 40-1 to 40-4, whereby, on the screen 50, as illustrated in FIG. 4, an image A of the channel CHA, an image B of the channel CHB, an image C of the channel CHC, and an image D of the channel CHD are sequentially displayed at a time at intervals of 1/240 s.

Part (b) of FIG. 3 illustrates the timing of turning ON/OFF the shutters 71 of the pairs of glasses with shutters 70-1 to 70-4 on the basis of shutter control signals output from the shutter-of-glasses control unit 80. As in part (a) of FIG. 3, time (T) is plotted in abscissa in part (b) of FIG. 3.

Part (b) of FIG. 3 illustrates that the shutter 71 of the pair of glasses with a shutter 70-1 is opened (ON) at t1 at which a video image is output from the projector 40-1, and the shutter 71 is closed until t5 at which the next video image is output from the projector 40-1. Similarly, the shutter 71 of the pair of glasses with a shutter 70-2 is opened in synchronization with t2 at which a video image is output from the projector 40-2, and the shutter 71 of the pair of glasses with a shutter 70-3 is opened in synchronization with t3 at which a video image is output from the projector 40-3. The shutter 71 of the pair of glasses with a shutter 70-4 is opened in synchronization with t4 at which a video image is output from the projector 40-4.

That is, part (b) of FIG. 3 illustrates that the shutters 71 of the pairs of glasses with shutters 70-1 to 70-4 are opened in accordance with the timing of outputting video images from the projectors 40-1 to 40-4 (the timing of inputting synchronization signals).

Although only t1 to t5 are illustrated in FIG. 3, if the last frame input from the time-division output unit 20 is FE (E is a number represented by m×n×p where m is the number of frames of an input image, n is the number of times the frame rate is increased, and p is the number of times the process of playback and displaying is repeated), the timing continues until tE at which the last frame FE is output. That is, as illustrated in part (b) of FIG. 3, the shutter 71 of the pair of glasses with a shutter 70-1 is opened at t1, t5, . . . , tE-3 at which a video image is output from the projector 40-1, as illustrated in part (a) of FIG. 3. The shutter 71 of the pair of glasses with a shutter 70-2 is opened at t2, t6, . . . , tE-2 at which a video image is output from the projector 40-2. The shutter 71 of the pair of glasses with a shutter 70-3 is opened at t3, t7, . . . , tE-1 at which a video image is output from the projector 40-3. The shutter 71 of the pair of glasses with a shutter 70-4 is opened at t4, t8, . . . , tE at which a video image is output from the projector 40-4.

Figure 5:
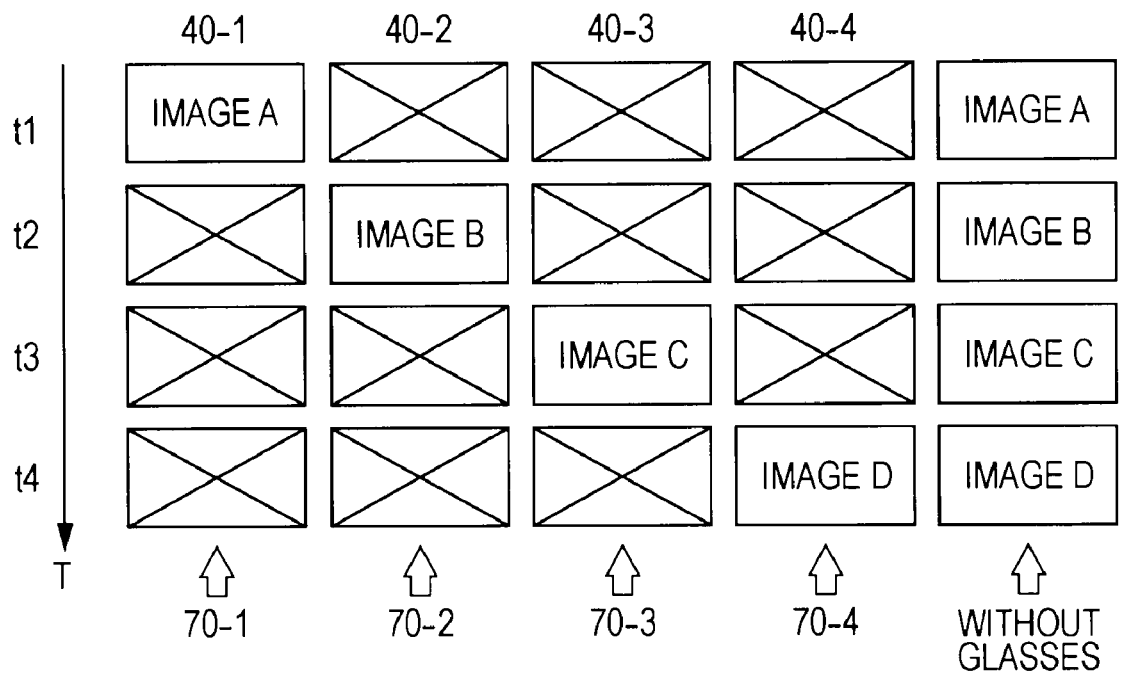
FIG. 5 is a diagram illustrating an example of displaying images on a screen according to the first embodiment of the present invention.

FIG. 5 illustrates images seen by the users U1 to U4 wearing the pairs of glasses with shutters 70-1 to 70-4, respectively. In FIG. 5, time (T) is plotted in ordinate. At the left end in FIG. 5, images seen by the user U1 wearing the pair of glasses with a shutter 70-1, which allows transmission of only a video image output from the projector 40-1, are illustrated. At t1, the user U1 can see the image A since the shutter 71 is opened. However, the shutter 71 is closed from t2 to t4, and accordingly, the user U1 can see no image at all.

Similarly, the user U2 wearing the pair of glasses with a shutter 70-2, which allows transmission of only a video image output from the projector 40-2, can see only the image B displayed at t2. The user U3 wearing the pair of glasses with a shutter 70-3, which allows transmission of only a video image output from the projector 40-3, can see only the image C displayed at t3. The user U4 wearing the pair of glasses with a shutter 70-4, which allows transmission of only a video image output from the projector 40-4, can see only the image D displayed at t4.

In contrast, a person who is not wearing a pair of glasses with a shutter 70 can see all the images output from the projectors 40, such as the image A at t1, the image B at t2, and so forth. That is, when a person who is not wearing the pair of glasses with a shutter 70 sees the screen, images in which all the details of image quality adjustments performed by the users U1 to U4 are reflected can be seen.

The images seen in such a manner have an averaged resolution. That is, images seen without using the pair of glasses with a shutter 70 have a resolution of ("significantly high resolution"+"high resolution"+"low resolution"+"significantly low resolution")/4.

Furthermore, images seen without wearing the pair of glasses with a shutter 70 are displayed at 240 Hz, which is four times as high as the frame rate of the input image.

Figure 6:
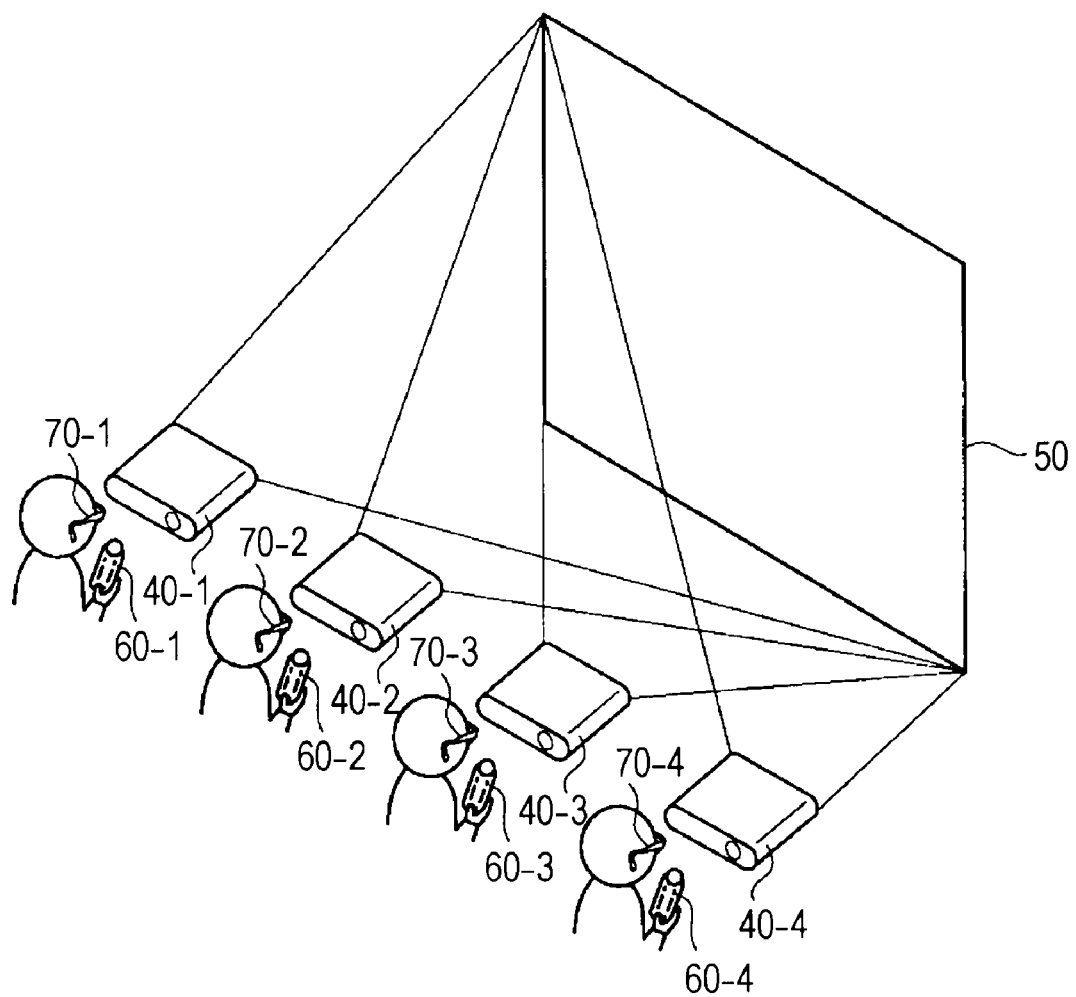
FIG. 6 is a schematic diagram illustrating a structure example of a system according to the first embodiment of the present invention.

FIG. 6 schematically illustrates a structure example of a system according to the present embodiment. The screen 50 is placed on a wall. Images are sequentially projected onto the screen 50 from the projectors 40-1 to 40-4 in a time-division manner. The users U1 to U4 wear the pairs of glasses with shutters 70-1 to 70-4, respectively. While looking at the images displayed on the screen 50, the users U1 to U4 perform image quality adjustments using the remote controllers 60-1 to 60-4.

The shutter 71 of the pair of glasses with a shutter 70-1, which is worn by the user U1, is opened at t1, t5, tE-3 at which a video image is output from the projector 40-1. Accordingly, the user U1 can see only images A1 to A(m×p) output at t1, t5, . . . , tE-3 from the projector 40-1. That is, the user U1 is in charge of the work of image quality adjustment of the images A1 to A(m×p) output from the projector 40-1.

The shutter 71 of the pair of glasses with a shutter 70-2, which is worn by the user U2, is opened at t2, t6, tE-2 at which a video image is output from the projector 40-2. Accordingly, the user U2 can see only images B1 to B(m×p) output at t2, t6, . . . , tE-2 from the projector 40-2. That is, the user U2 is in charge of the work of image quality adjustment of the images B1 to B(m×p) output from the projector 40-2.

The shutter 71 of the pair of glasses with a shutter 70-3, which is worn by the user U3, is opened at t3, t7, tE-1 at which a video image is output from the projector 40-3. Accordingly, the user U3 can see only images C1 to C(m×p) output at t3, t7, . . . , tE-1 from the projector 40-3. That is, the user U3 is in charge of the work of image quality adjustment of the images C1 to C(m×p) output from the projector 40-3.

The shutter 71 of the pair of glasses with a shutter 70-4, which is worn by the user U4, is opened at t4, t8, . . . , tE at which a video image is output from the projector 40-4.

Accordingly, the user U4 can see only images D1 to D(m×p) output at t4, t8, . . . , tE from the projector 40-4. That is, the user U4 is in charge of the work of image quality adjustment of the images D1 to D(m×p) output from the projector 40-4.

By performing the foregoing processing, using a single screen, the multiple users U can simultaneously perform the work of image quality adjustment emphasizing on different adjustment items.

Figure 7:
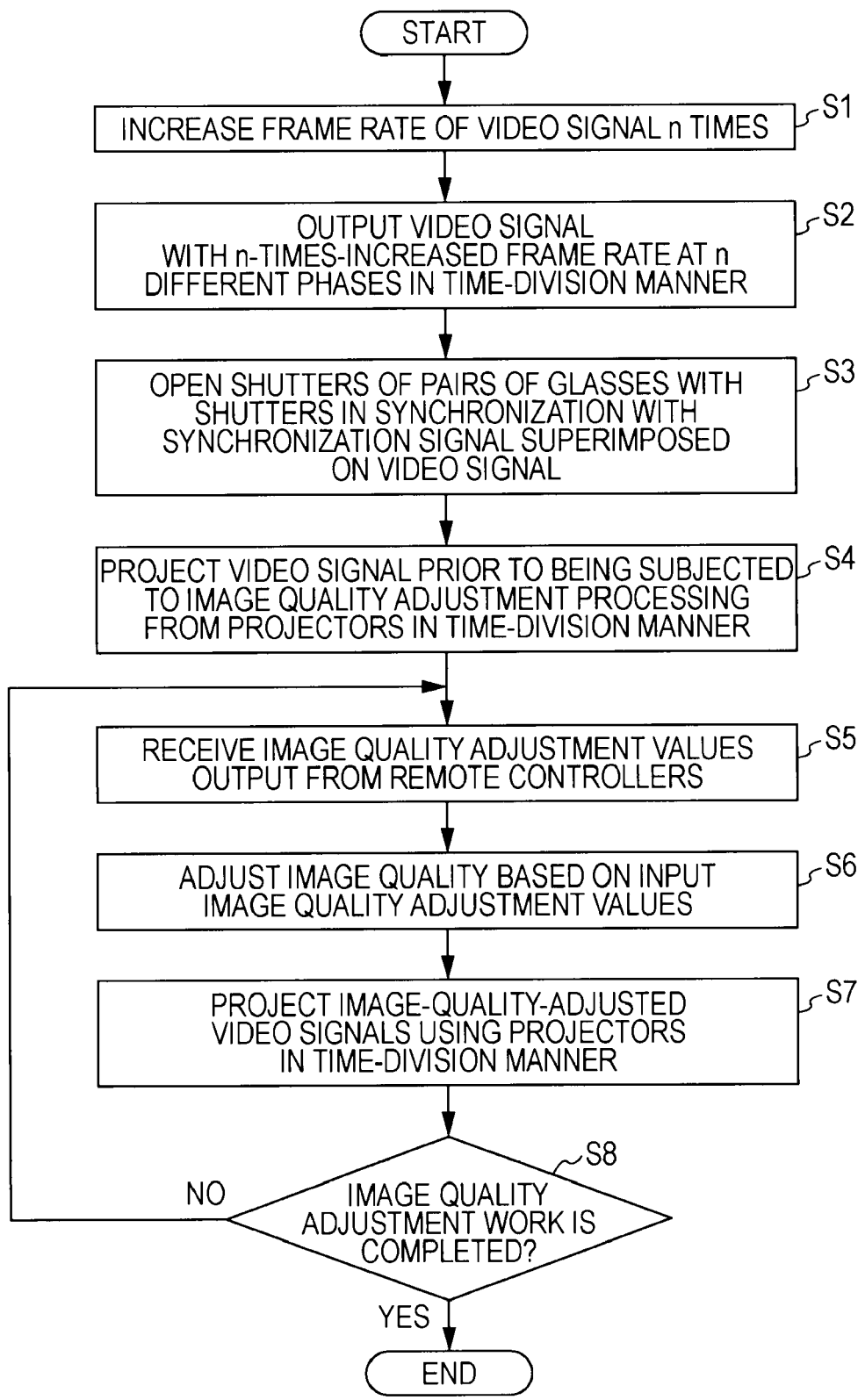
FIG. 7 is a flowchart illustrating an example of a process performed at the time of adjusting image quality according to the first embodiment of the present invention.

Referring now to the flowchart illustrated in FIG. 7, an example of a process during the image quality adjustment in the entire system will be described. In FIG. 7, at first, the frame rate of a video signal is increased n times by the time-division output unit 20 (see FIG. 1) (step S1), and frames with an n-times increased frame rate are output in a time-division manner while shifting the phase to have n phases, respectively (step S2). At the timing of outputting the frames having n phases of the image with an n-times increased frame rate in a time-division manner, in synchronization with a synchronization signal superimposed on the video signal, the shutters 71 of the pairs of glasses with shutters 70-1 to 70-4 are opened (step S3).

The video signal prior to being subjected to image quality adjustment, which is supplied from the time-division output unit 20, is projected in a time-division manner via the signal processing units 30-1 to 30-4 from the projectors 40-1 to 40-4 (step S4). The users U1 to U4 wearing the pairs of glasses with shutters 70-1 to 70-4 enter adjustment values using the remote controllers 60-1 to 60-4. The adjustment values are input to the signal processing units 30-1 to 30-4 (step S5).

The signal processing units 30-1 to 30-4 perform image quality adjustment processing using the input adjustment values (step S6), and the image-quality-adjusted video signals are output to the projectors 40-1 to 40-4. The projectors 40-1 to 40-4 project video images onto the screen 50 in a time-division manner (step S7). Next, it is determined whether the work of image quality adjustment performed by the users U1 to U4 is completed (step S8). When the work is completed, the process is terminated. When the work is not completed, the flow returns to step S5, and the process is continued.

Referring now to the flowchart illustrated in FIG. 8, an example of a process performed at the time of replaying, using the signal processing units 30-1 to 30-4, in order to check the result of the adjustment performed so far will be described. When a replay instruction is given via the remote controller 60 or the like, a video signal in frame periods Fs to Fe is input to the video-signal input unit 10 (see FIG. 1). The frame rate of the video signal is increased four times using the time-division output unit 20, and frames of the video signal are output to the signal processing units 30-1 to 30-4 in a time-division manner (step S11).

The signal processing units 30-1 to 30-4 read adjustment values from the image-quality-adjustment-value recording units 31-1 to 31-4, respectively (step S12), and, using the read adjustment values, adjust the image quality of the input video signals (step S13). The image-quality-adjusted video signals are output to the projectors 40-1 to 40-4 (step S14). Upon receipt of a replaying termination instruction from the remote controllers 60-1 to 60-4, an input of a video signal is terminated. It is determined whether there is an input of a video signal (step S15). When an input of a video signal is completed, the process is terminated. While an input of a video signal is still being accepted, the flow returns to step S11, and the process is continued.

Also in this case, when images projected onto the screen 50 are seen without using the pair of glasses with a shutter 70, images in which the details of image quality adjustments performed by the users U1 to U4 are reflected can be seen. By adjusting the selector switch of the pair of glasses with a shutter 70 to an arbitrary channel, a history of image quality adjustment processing of a video image of that channel can be checked.

Figure 8:
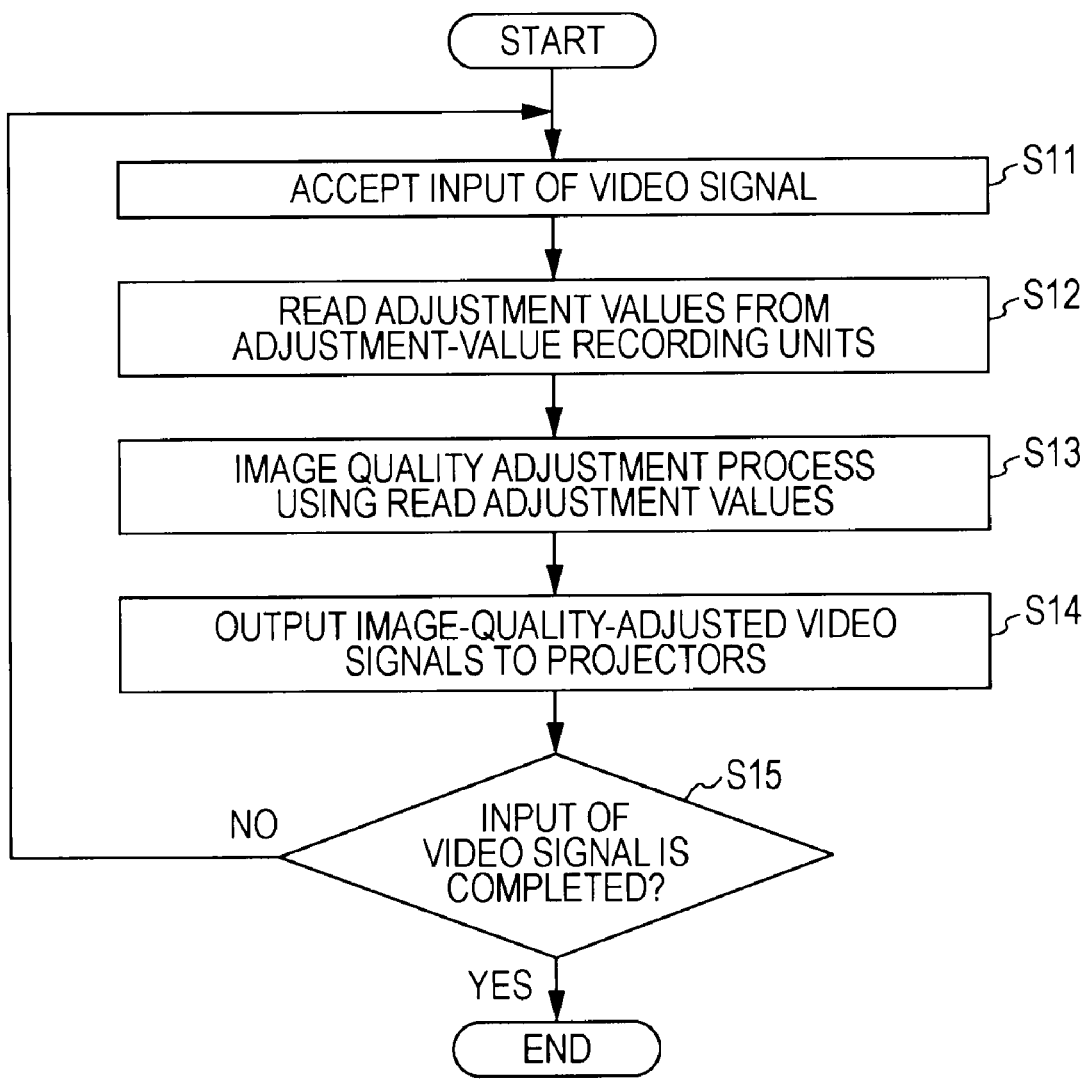
FIG. 8 is a flowchart illustrating an example of a process performed at the time of replaying according to the first embodiment of the present invention.

In FIG. 8, the case where replaying is performed using all the projectors 40-1 to 40-4 has been described by way of example. However, replaying may be performed using only one of the projectors 40-1 to 40-4, such as the projector 40-1.

According to the foregoing embodiment, the frame rate of an input video signal is increased n times, and the video signal with an n-times increased frame rate is displayed at n different phases in a time-division manner. Each user U can see, through the pair of glasses with a shutter 70, only one of images displayed n times in a time-division manner, and adjust the image quality. Accordingly, using a single screen, the multiple users U can simultaneously perform the work of image quality adjustment, thereby reducing the work time.

According to the foregoing embodiment, when the work is shared among multiple persons, images whose image quality is to be adjusted by the users U are individually displayed in a time-division manner. Therefore, it becomes unnecessary to divide the region of the screen in accordance with the number of users U, and accordingly, image quality adjustment can be performed on a large screen. Also, a vast adjustment space is necessary for locating large screens that are necessary for individual users. That is, image quality adjustment can be performed on a screen having the same size as that of a screen on which content is actually presented. Therefore, the details of image quality adjustment can be made more suitable for the actual viewing environment.

According to the foregoing embodiment, the image quality of the same content can be adjusted by the multiple users U. Thus, the skills and knowledge of n persons can be reflected in the work of image quality adjustment. Fine adjustments, or various adjustments that suit various preferences of viewers can be performed. Hitherto, when one person performs adjustment, there may be an oversight due to the lack of the person's carefulness. However, according to the foregoing embodiment, multiple users U can perform adjustment. The load on each user U is alleviated, and an oversight can be prevented. Therefore, the image quality can be enhanced. This will be described in detail later.

Furthermore, according to the foregoing embodiment, operation histories are accumulated. Thus, the amount of data to be accumulated becomes a hundred-thousandth part to a millionth part of that in the case where images themselves are accumulated. Accordingly, the memory capacity can be significantly saved. Also, the adjustment work can be performed any number of times without worrying about the memory capacity.

According to the foregoing embodiment, when a person who is not wearing the pair of glasses with a shutter 70 sees images projected onto the screen 50, an average image currently being subjected to image quality adjustment performed by n persons can be checked in real time. Accordingly, it becomes easier to detect a new adjustment axis or to receive a hint for development. A new adjustment axis and a hint for development will be described below.

In the past, it has been regarded that video signals to be broadcast are supposed to have as high fidelity to the real world as possible. As a result, the number of pixels has been increased as much as possible, and the number of colors has been increased to 8 bits (1670 colors) or more. That is, the law of large numbers, which is a theorem that states that conditions close to the actual world will converge to one, has played a major role. However, even when image quality adjustment of an image is performed on the basis of this theorem, the image-quality-adjusted image is seen by a human being. Whether the image displayed on the screen is considered beautiful or favorable depends on the working of the eyes and the brain of each individual. In other words, the actual world would not converge to one in any circumstances. Therefore, finding and providing an image quality adjustment axis that suits the individual's taste will help bring tremendous value.

Therefore, using the video-signal processing apparatus according to the present embodiment, when operation histories of various users U are obtained and the obtained examination values and the recording of feature amounts of the classification adaptive process at that time are statistically analyzed, a new adjustment axis may be found. That is, an adjustment axis that differs from that within the range of assumption that the relationship between the adjustment purpose and the adjustment value is in accordance with an existing theorem can be discovered. In this case, a community including people who use similar adjustment axes may be discovered or defined. On the basis of such information, a new service can be provided.

Second Embodiment

Figure 9:
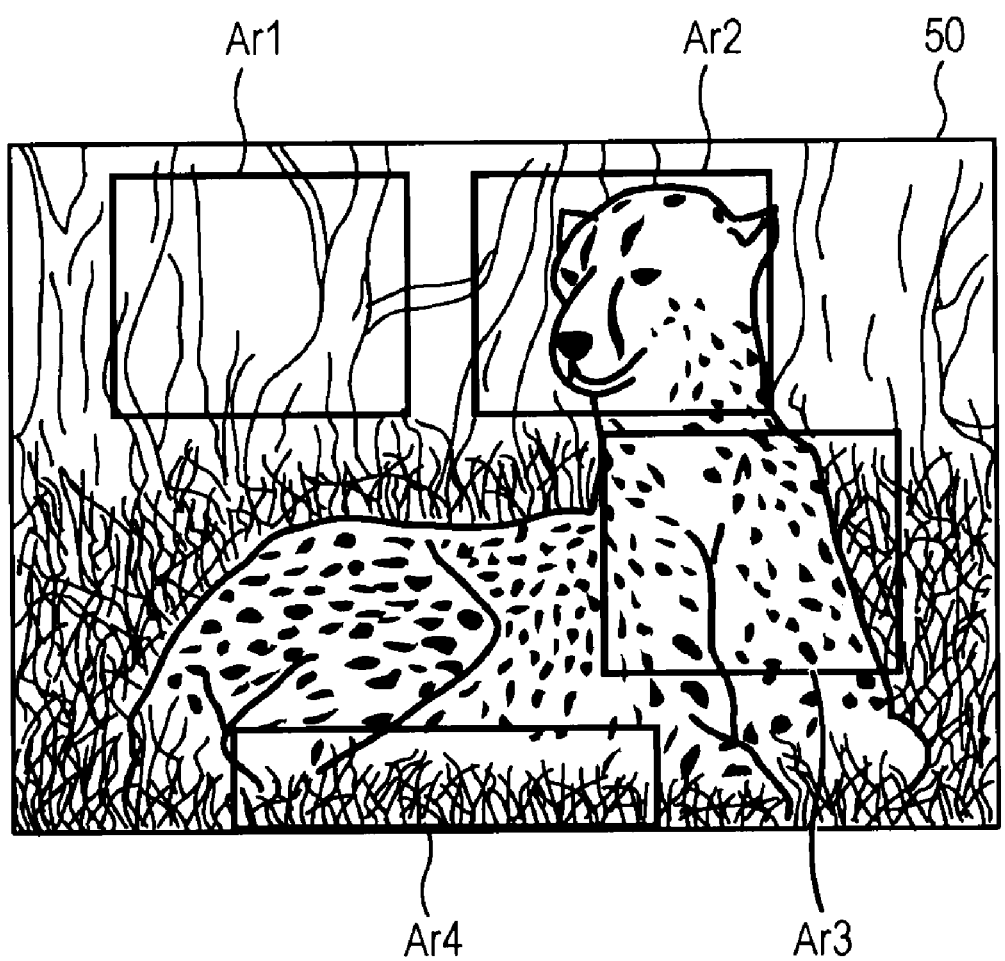
FIG. 9 is a diagram illustrating an example of work areas according to a second embodiment of the present invention.

A second embodiment of the present invention will now be described with reference to FIGS. 9 to 11D. In the present embodiment, for each user U, an area for performing the work of image quality adjustment is set. Each user U is in charge of image quality adjustment of an image displayed on the area set for the user U to be in charge of. FIG. 9 illustrates an example of area division. The screen 50 illustrated in FIG. 9 displays an image of a leopard. On the screen 50, four areas Ar1 to Ar4 are provided as areas for the work of image quality adjustment. In the area Ar1, trees in the background of the leopard are displayed. In the area Ar2, the head portion of the leopard is displayed. In the area Ar3, the body portion of the leopard is displayed. In the area Ar4, grasses on which the leopard is lying are displayed.

In the present embodiment, these areas Ar1 to Ar4 are moved in accordance with the movement of an animal body on the screen (the leopard in this case). The area Ar1 is allocated to the user U1. The area Ar2 is allocated to the user U2. The area Ar3 is allocated to the user U3. The area Ar4 is allocated to the user U4. That is, the areas Ar (hereinafter may also be called the "work areas") are individually allocated to the users U.

The system structure is the same as that illustrated in FIG. 1. The frame rate of a video signal is increased n times using the time-division output unit 20 (see FIG. 1), and frames having n phases are output in a time-division manner. In synchronization with the synchronization signal, the shutters 71 of the pairs of glasses with shutters 70-1 to 70-4 are opened/closed. In addition, in the present embodiment, video signals output from the time-division output unit 20 in a time-division manner are subjected to mask processing so that images in areas other than a predetermined area will not be displayed. In this way, the users U1 to U4 can see only the images in the areas Ar set for the users U1 to U4 to be in charge of and perform image quality adjustment.

Furthermore, an administrator Ad who manages the entire work and the details of the work of each user U can see an unmasked screen, as illustrated in FIG. 9, by looking at the screen without wearing the pair of glasses with a shutter 70.

Figure 10:
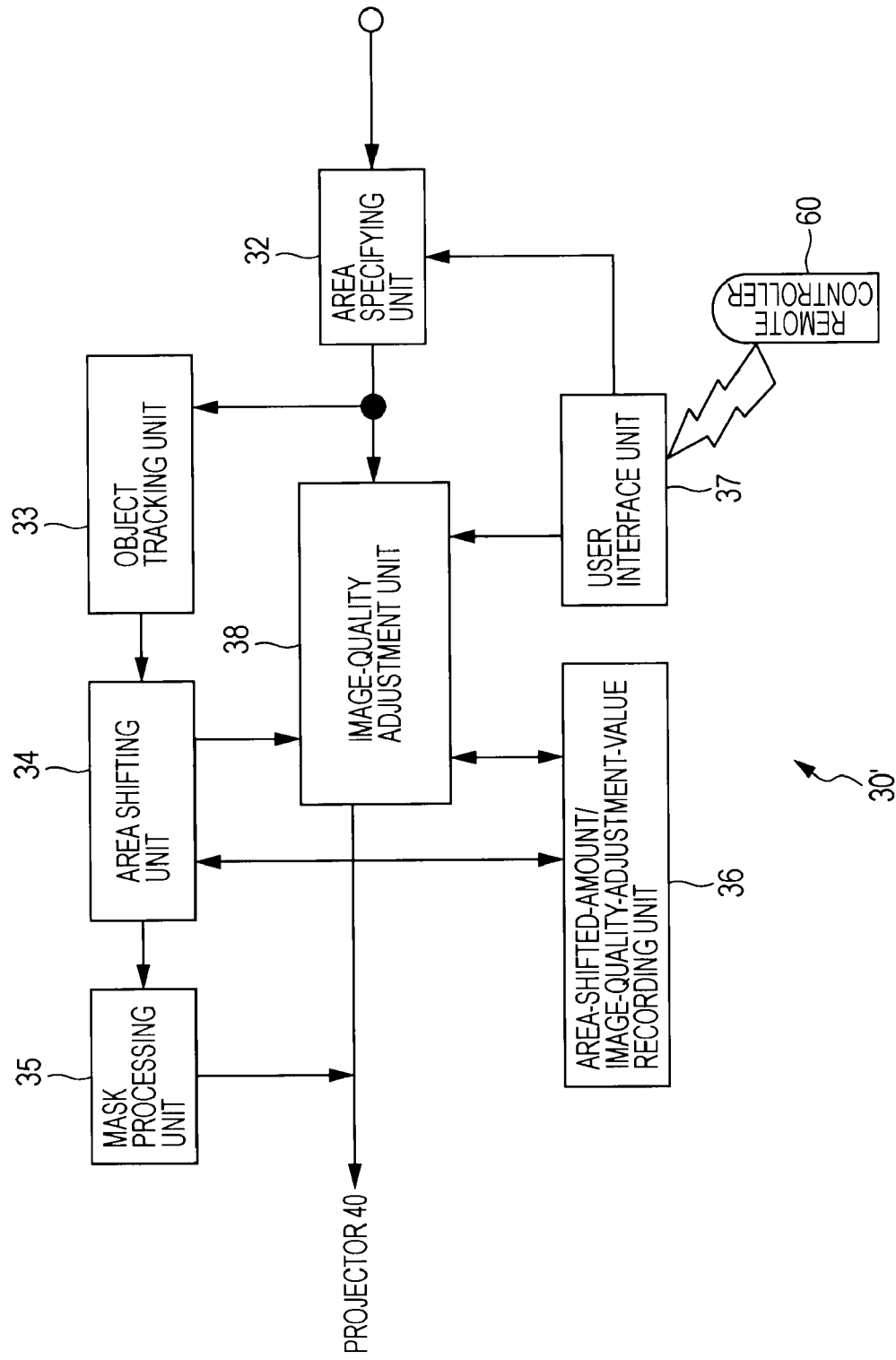
FIG. 10 is a block diagram illustrating an internal structure example of a system according to the second embodiment of the present invention.

FIG. 10 illustrates an internal structure example of a signal processing unit 30' according to the present embodiment. The signal processing unit 30' illustrated in FIG. 10 is common to all signal processing units 30'-1 to 30'-4. The signal processing unit 30' includes an area specifying unit 32, an object tracking unit 33, an area shifting unit 34, a mask processing unit 35, an area-shifted-amount/image-quality-adjustment-value recording unit 36, a user interface unit 37, and an image-quality adjustment unit 38.

When a signal that specifies the size and position of the work area Ar is input from the remote controller 60 via the user interface unit 37, the area specifying unit 32 performs processing so that information of the specified area Ar can be reflected in a video signal input from the time-division output unit 20. The area specifying unit 32 outputs the video signal in which the information of the area Ar is reflected as additional information to the object tracking unit 33 and the image-quality adjustment unit 38.

The object tracking unit 33 tracks an animal body existing in the work area Ar. For example, when the area specifying unit 32 inputs a video signal constituting the image illustrated in FIG. 9 and information of the area Ar2 to the object tracking unit 33, the object tracking unit 33 tracks the head portion of the leopard positioned in the area Ar2. The object tracking unit 33 outputs tracking information to the area shifting unit 34. Specifically, when the information of the area Ar2 is input from the area specifying unit 32 to the object tracking unit 33, the object tracking unit 33 obtains a feature amount (e.g., hue) of the object in the area Ar2 on the basis of the x and y coordinate values indicating the start point and the end point of the area Ar2. In the case of the area Ar2, since the head of the leopard is displayed in the area Ar2, the value of yellow, for example, is stored.

By calculating the difference (activity) between a pixel value of the current frame and a pixel value of the previous frame in the same area, a motion vector between the frames is calculated. Pixel values used for comparison may have a one-to-one correspondence or many-to-many correspondence. At the same time, it is determined, on the basis of the feature amount obtained in the area, whether the object displayed in the current frame is the same as the object displayed in the previous frame. As a result of the determination, the amount of movement of the object is determined. The object tracking unit 33 outputs this amount of movement as the amount of area to be shifted (tracking information) to the area shifting unit 34.

In the image quality adjustment, the area shifting unit 34 moves the position of the area Ar to the position at which the animal body exists, on the basis of the tracking information input from the object tracking unit 33. The area shifting unit 34 outputs position information of the moved area Ar to the mask processing unit 35 and the image-quality adjustment unit 38 and outputs the amount of movement of the area Ar to the area-shifted-amount/image-quality-adjustment-value recording unit 36. In replaying playback, the area shifting unit 34 moves the position of the area Ar to the position at which the animal body exists, on the basis of the tracking information input from the area-shifted-amount/image-quality-adjustment-value recording unit 36.

Figure 11A:
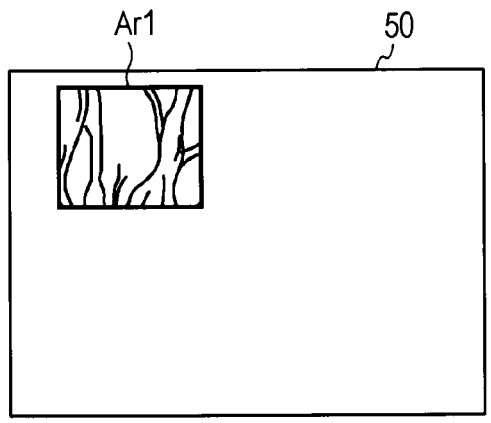
Figure 11B:
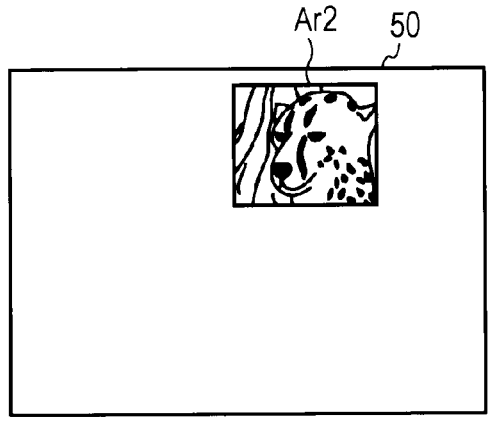
Figure 11C:
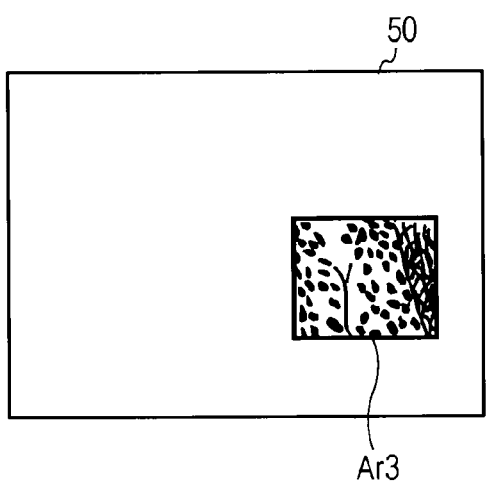

On the basis of the position (and size) of the area Ar input from the area shifting unit 34, the mask processing unit 35 performs processing to mask areas other than the area Ar. FIGS. 11A to 11D illustrate examples of images obtained by processing performed using the mask processing unit 35. FIG. 1A illustrates a state in which areas other than the area Ar1 are masked. FIG. 11B illustrates a state in which areas other than the area Ar2 are masked. FIG. 11C illustrates a state in which areas other than the area Ar3 are masked.

Figure 11D:
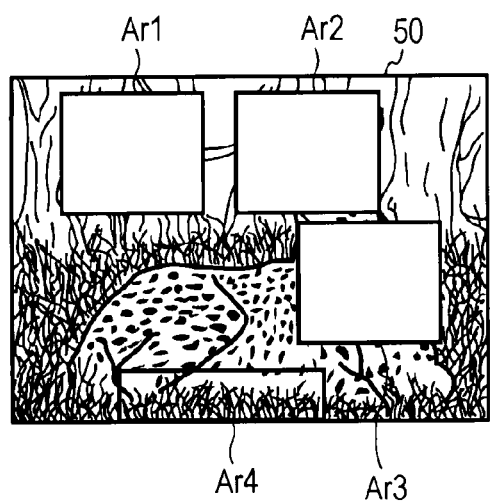

FIG. 11D illustrates a screen provided to the user U4 who performs image quality adjustment in the area Ar4. In FIG. 11D, areas other than the area Ar4 are also displayed. This is to allow, for example, the administrator Ad to see the screen such as that illustrated in FIG. 9, when the administrator Ad looks at the screen without using the pair of glasses with a shutter 70.

If areas other than the area Ar4 are masked in FIG. 11D, when images illustrated in FIG. 11A to 11D are sequentially output from the projectors 40-1 to 40-4, the masked areas are displayed in a composite image generated by combining these images. In order to check the balance of the entire screen when the screen is seen without wearing the pair of glasses with a shutter 70, in the image illustrated in FIG. 11D, the areas Ar1 to Ar3 are masked, and all the other areas that even include areas other than the area Ar4 are displayed. With such processing, an image on the screen seen without wearing the pair of glasses with a shutter 70 becomes an image including no masked areas, such as that illustrated in FIG. 9.

Referring back to FIG. 10, the area-shifted-amount/image-quality-adjustment-value recording unit 36 records the amount of movement of the area Ar, which is input from the area shifting unit 34, and the adjustment value of image quality adjustment performed using the image-quality adjustment unit 38. At the time an image-quality-adjusted image is replayed in order to check the details of image quality adjustment after the end of the adjustment work, the area-shifted-amount/image-quality-adjustment-value recording unit 36 outputs the accumulated image quality adjustment value to the area shifting unit 34 and the amount of movement of the area Ar to the image-quality adjustment unit 38.

In the image quality adjustment, the image-quality adjustment unit 38 applies image quality adjustment processing only to, within the video signal input from the area specifying unit 32, the area Ar input from the area shifting unit 34. As the image quality adjustment value, the value input from the remote controller 60 via the user interface unit 37 is used. The image-quality adjustment unit 38 outputs the image-quality-adjusted video signal to the projector 40, and the adjustment value used in image quality adjustment to the area-shifted-amount/image-quality-adjustment-value recording unit 36. Also, in replaying playback, the image-quality adjustment unit 38 applies image quality adjustment processing only to the area Ar input from the area shifting unit 34 by using the image quality adjustment value input from the area-shifted-amount/image-quality-adjustment-value recording unit 36. The image-quality adjustment unit 38 outputs the image-quality-adjusted video signal to the projector 40.

FIG. 12 illustrates an example in which the work is shared among the users U according to the present embodiment. The user U1 wearing the pair of glasses with a shutter 70-1, which allows transmission of only a video image output from the projector 40-1, sees the area Ar1 displaying the images A1 to A(m×p) output from the projector 40-1. The user U1 performs image quality adjustment, in the area Ar1, of the images A1 to A(m×p) using the remote controller 60-1. Here, "m" and "p" are the same as those in the first embodiment. That is, "m" indicates the total number of frames from the start frame Fs to the end frame Fe subjected to image quality adjustment, and "p" indicates the number of repetitions in the case where m input frames are repeatedly input to the video-signal input unit 10.

Similarly, the user U2 performs image quality adjustment, in the area Ar2, of the images B1 to B(m×p). The user U3 performs image quality adjustment, in the area Ar3, of the images C1 to C(m×p). The user U4 performs image quality adjustment, in the area Ar4, of the images D1 to D(m×p).

The administrator Ad looks at the screen without wearing the pair of glasses with a shutter 70, whereby the administrator Ad can check images in which all the details of adjustments performed by the users U1 to U4 in the areas Ar1 to Ar4 are reflected. Accordingly, the balance of the entire screen can be checked. This makes it possible for the administrator Ad to individually give instructions to the users U1 to U4 so as to keep the balance of the entire screen. As a result, even when an image is divided into regions Ar and the image quality thereof is adjusted in the individual regions Ar, the image-quality-adjusted image becomes, as a whole, a well-balanced image.

According to the foregoing second embodiment, different work areas Ar can be assigned to different users U, and image quality adjustments can be performed in parallel in the time domain. Since the image quality adjustment according to the type of object being displayed in each area can be assigned to a corresponding user U, adjustment becomes less likely to vary from object to object. That is, for example, the user U2 who is in charge of the area Ar2 performs image quality adjustment of only the head portion of the leopard displayed in the area Ar2. Thus, the image quality of the head portion of the leopard becomes well-balanced in a section where the image quality adjustment is performed. Using the foregoing method, image quality adjustment can be unevenly or locally performed on a large screen.

Also, according to the foregoing second embodiment, the position of the work area Ar changes as the animal body in the video image moves. Thus, the animal body being subjected to image quality adjustment is prevented from disappearing from the work area Ar. In contrast, since the work area Ar moves within the range of the screen, the user U may have difficulty in following the work area Ar.

Therefore, for example, a motion vector of an animal body serving as a target to be image-quality adjusted is extracted, and a video image is moved in a direction opposite to the extracted motion vector. Accordingly, the position of the work area Ar can be fixed to a predetermined position, and the animal body serving as a target to be image-quality adjusted is prevented from disappearing from the work area Ar.

Also, when it is recognized, at the time of checking an image prior to being subjected to image quality adjustment, that the movement range of the animal body serving as a target to be image-quality adjusted is slightly larger than the currently set work area Ar, the user U may change (reset) the work area Ar so that the movement range of the animal body will be within the work area Ar. In this case, the position and size of the work area Ar are fixed, and the animal body serving as a target to be image-quality adjusted is prevented from disappearing from the work area Ar. Also, it is unnecessary to extract a motion vector of the animal body.

Furthermore, the user U may arbitrarily select one of the method of moving the position of the work area Ar so as to follow the movement of the animal body, the method of keeping the position of the work area Ar fixed while following the movement of the animal body, and the method of changing the size of the work area Ar.

In the foregoing embodiments, since the projectors 40 capable of displaying an image at a frame rate of 60 Hz are used, the frame rate of a video signal is increased n times using the time-division output unit 20 and the projectors 40-1 to 40-4 which can perform displaying in parallel. However, the embodiments are not limited to this structure. For example, as in the foregoing embodiments, when the frame rate of an input video signal is 60 Hz and the work is shared among four users U, if a projector 40 capable of driving at 240 Hz is used, it becomes unnecessary to provide the time-division output unit 20.

In the foregoing first embodiment, when such a projector 40 is used, for example, a combining unit that combines video signals output from the signal processing units 30-1 to 30-4 may further be provided, and a composite video signal may be projected from the projector 40. Since four video signals are time-sequentially output from the time-division output unit 20, the combining unit in this case is implemented by a multiplexer (parallel-to-serial conversion).

When such a composite video image is to be obtained in the second embodiment, processing is performed to reduce the frame rate of video signals individually adjusted using the signal processing units 30-1 to 30-4 from 240 Hz to 60 Hz. The video signals are combined using an adder implemented by an OR circuit or the like, and a composite video signal may be output from any one of the projectors 40-1 to 40-4.

In the foregoing embodiments, as illustrated in FIG. 6, front projectors are used as the projectors 40. However, the foregoing embodiments are not limited to this. For example, rear-projection-type projectors 40 may be used. Also, the foregoing embodiments may be applied to direct-viewing-type displays, such as organic electroluminescence (EL) displays, field emission displays (FEDs), and LCDs, as long as these displays are capable of driving at a high frame rate, such as 240 Hz.

In the foregoing embodiments, the examples where resolution and the degree of noise suppression are adjusted have been described. However, the foregoing embodiments are not limited to these examples. For example, using the structure and processing according to the embodiments of the present invention, the users U may individually adjust parameters, such as hue or saturation of an image. Alternatively, the users U may perform gamma value correction. When the foregoing embodiments are applied to an apparatus that performs display using a field sequential method, the users U may share the work of image quality adjustment on signals, namely, R signal, G signal, and B signal, of a video signal.

Among the above-described processes, a series of processes performed by the time-division output unit 20, the signal processing unit 30, the shutter-of-glasses control unit 80, and the like may be executed by hardware or software. When the series of processes is to be executed by software, a program constituting the software is installed into a computer. The "computer" here includes a computer embedded in dedicated hardware, a general personal computer that can execute various functions by using various programs installed therein, and the like.

FIG. 13 is a block diagram illustrating a structure example of hardware of a computer that executes the foregoing series of processes by using a program.

In the computer, a central processing unit (CPU) 101, a read-only memory (ROM) 102, and a random access memory (RAM) 103 are interconnected by a bus 104.

Furthermore, an input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a loudspeaker, a signal output terminal, and the like. The storage unit 108 includes a hard disk, a non-volatile memory, and the like. The communication unit 109 includes an infrared communication module, a network interface, and the like. The drive 110 drives the removable medium 111 including a magnetic disk, an optical disk, a magneto-optical disk, or a semiconductor memory.

In the computer constructed as above, for example, the CPU 101 loads a program recorded in the storage unit 108 into the PAM 103 via the input/output interface 105 and the bus 104 and executes the program, thereby executing the foregoing series of processes.

The program executed by the computer (CPU 101) is provided by, for example, recording it on the removable medium 111 serving as a packaged medium or the like. Alternatively, the program may be provided via a wired or wireless transmission medium, such as a local area network (LAN), the Internet, or digital satellite broadcasting.

The program can be installed into the storage unit 108 via the input/output interface 105 by mounting the removable medium 111 onto the drive 110. Alternatively, the program may be received at the communication unit 109 via a wired or wireless transmission medium and installed into the storage unit 108. Alternatively, the program may be installed in advance in the ROM 102 or the storage unit 108.

The program executed by the computer may be a program with which the processes are performed time sequentially in accordance with the order described in the specification, or may be a program with which the processes are executed in parallel or at necessary times, such as when called.

In the specification, the steps described in the flowcharts may include those that are performed time sequentially in accordance with the described order, and those that are executed in parallel or at necessary times, such as when called, not necessarily time-sequentially.

In the present specification, the term "system" represents the overall apparatus that is constituted by a plurality of apparatuses.

The embodiments of the present invention are not limited to the foregoing embodiments, and various modifications can be made without departing from the gist of the present invention.

The present application contains subject matter related to that disclosed in Japanese Priority Patent Applications JP 2008-150964 and 2009-124110 filed in the Japan Patent Office on Jun. 4, 2008 and May 22, 2009, respectively, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video-signal processing apparatus comprising:
a video-signal input unit to which a video signal including multiple images arranged in a time sequential manner is input;
a time-division output unit configured to output, in a time-division manner, the video signal constituting n images corresponding to the multiple images;
signal processing units configured to individually perform image quality adjustments on the n images output from the time-division output unit;
operation input units that receive user inputs from one or more users upon display of each of the n images to the one or more users, the user inputs including adjustment values corresponding to the image quality adjustments performed by the signal processing units; and
image output units configured to output images that have been subjected to the image quality adjustments using the signal processing units, wherein
the signal processing units include area specifying units configured to specify, within an area where the images are displayed, areas to be subjected to the image quality adjustments, and
the signal processing units perform image quality adjustments only on images output to the areas specified by the area specifying units.

2. The video-signal processing apparatus according to claim 1, wherein the signal processing units use different adjustable ranges of the adjustment values used in the image quality adjustments.

3. The video-signal processing apparatus according to claim 2, wherein the signal processing units include image-quality-adjustment-value recording units configured to record the adjustment values of the image quality adjustments, which are input via the operation input units, and
wherein the signal processing units perform the image quality adjustments using the adjustment values of the image quality adjustments, which are recorded in the image-quality-adjustment-value recording units.

4. The video-signal processing apparatus according to claim 3, wherein the areas specified by the area specifying units are different for the individual signal processing units.

5. The video-signal processing apparatus according to claim 4, wherein the signal processing units include mask processing units configured to perform mask processing on areas other than the areas specified by the area specifying units.

6. The video-signal processing apparatus according to claim 1, wherein the time-division output unit outputs the n images in a time-division manner, within a time period having the same length as a time period during which the multiple images input to the video-signal input unit were scanned.

7. The video-signal processing apparatus according to claim 1, wherein the image output units include shutters that are switchable between transmission and non-transmission of the images, and
wherein each of the shutters is opened only for a period of 1/n during which one of the n images is output from the time-division output unit.

8. The video-signal processing apparatus according to claim 3, wherein the signal processing units adjust resolutions of the images.

9. The video-signal processing apparatus according to claim 3, wherein the signal processing units adjust hues of the images.

10. The video-signal processing apparatus according to claim 3, wherein the signal processing units adjust saturation of the images.

11. The video-signal processing apparatus according to claim 3, wherein the signal processing units are provided in a manner correlated with red, green, and blue video signals included in the video signal, and the signal processing units individually perform image quality adjustments on the red video signal, the green video signal, and the blue video signal.

12. The video-signal processing apparatus according to claim 4, wherein the signal processing units include object tracking units configured to extract specific objects displayed in the areas specified by the area specifying units and to track the extracted objects, and
area shifting units configured to move the areas specified by the area specifying units in accordance with movement of the objects tracked by the object tracking units, and
wherein the image-quality-adjustment-value recording units record the amounts of movement of the areas being moved by the area shifting units.

13. A video-signal processing method comprising the steps of:
receiving an input of a video signal including multiple images arranged in a time sequential manner, the video signal serving as a single content item;
outputting a plurality of images generated on the basis of the multiple images, in a time-division manner, within output periods of the multiple images;
receiving user inputs from one or more users for each of the multiple images upon display of each of the multiple images to the one or more users; and
performing, by signal processing units, image quality adjustments on the multiple images in accordance with the user inputs, wherein
the signal processing units include area specifying units configured to specify, within an area where the images are displayed, areas to be subjected to the image quality adjustments, and
the signal processing units perform image quality adjustments only on images output to the areas specified by the area specifying units.

14. A non-transitory computer readable storage medium have executable instructions stored therein, which when executed by a processor in a video-signal processing apparatus causes the processor to execute a method comprising the steps of:
outputting, in a time-sequential manner, a video signal constituting n images corresponding to input multiple images arranged in a time sequential manner;
performing, by signal processing units, image quality adjustments individually on the n images;
obtaining adjustment values of the image quality adjustments performed in the step of performing image quality adjustments, the adjustment values corresponding to user inputs from one or more users for each of the n images upon display of each of the n images to the one or more users; and
outputting images that have been subjected to the image quality adjustments performed in the step of performing image quality adjustments, wherein
the signal processing units include area specifying units configured to specify, within an area where the images are displayed, areas to be subjected to the image quality adjustments, and
the signal processing units perform image quality adjustments only on images output to the areas specified by the area specifying units.

15. A video-signal processing system comprising:
a video-signal processing apparatus; and
one or more pairs of glasses,
wherein the video-signal processing apparatus includes
a video-signal input unit to which a video signal including multiple images arranged in a time sequential manner is input, the video signal serving as a single content item, and
a time-division output unit configured to output a plurality of images generated on the basis of the multiple images, in a time-division manner, within output periods of the multiple images, and
operation input units that receive inputs from one or more users for each of the multiple images upon display of each of the multiple images to the one or more users, and
signal processing units configured to individually perform image quality adjustments on the multiple images in accordance with the user inputs, and
wherein the one or more pairs of glasses include
shutters, each of the shutters being switchable between a state in which light is transmitted and a state in which light is blocked, and
shutter open/close control units, each of the shutter open/close control units being configured to open a corresponding one of the shutters in synchronization with a corresponding one of the plurality of images output from the time-division output unit in the video-signal processing apparatus, wherein the signal processing units include area specifying units configured to specify, within an area where the images are displayed, areas to be subjected to the image quality adjustments, and the signal processing units perform image quality adjustments only on images output to the areas specified by the area specifying units.

* * * * *